UNITED STATES PATENT OFFICE.

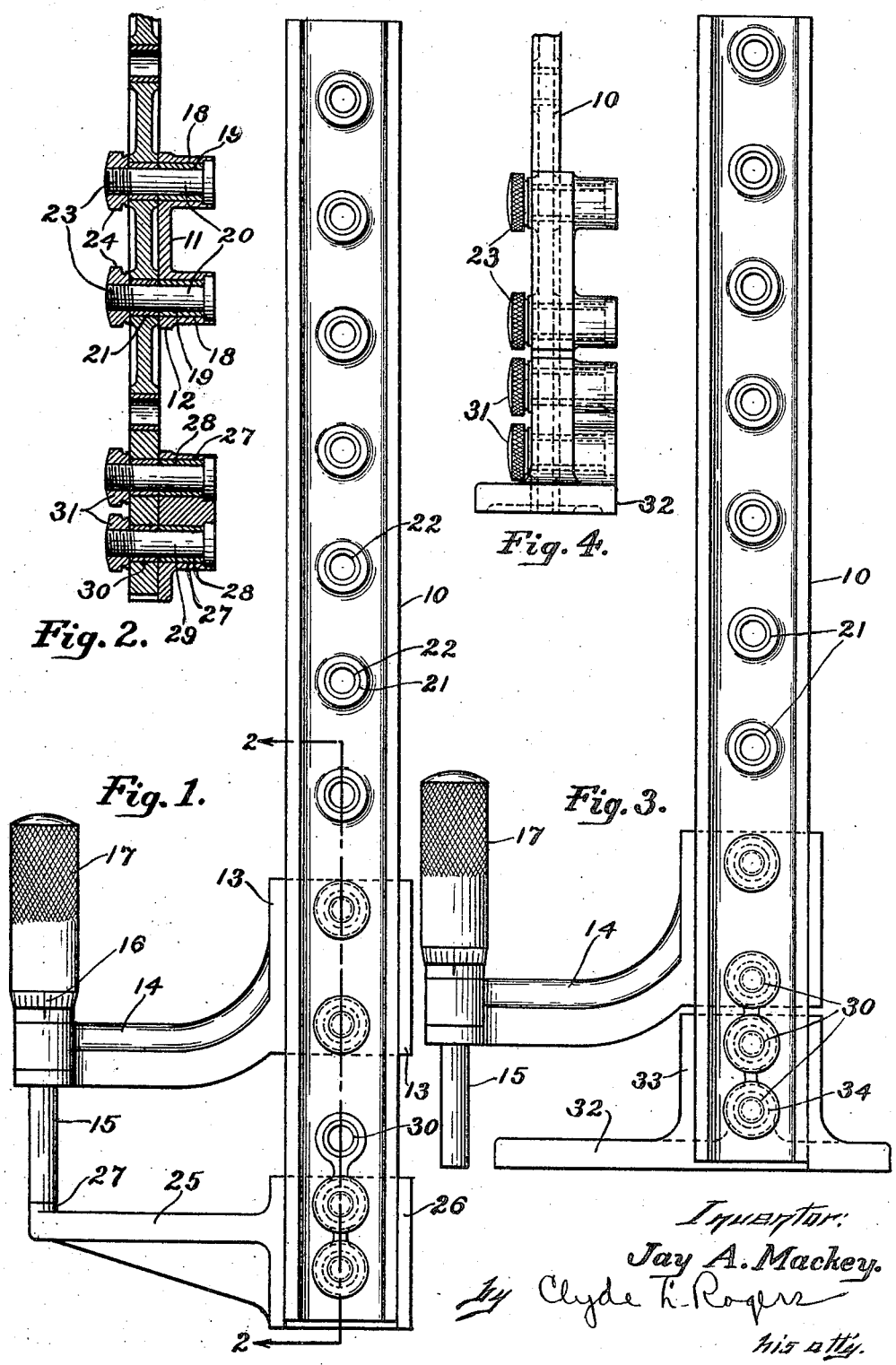

JAY A. MACKEY, OF LYNN, MASSACHUSETTS, ASSIGNOR OF ONE-HALF TO THOMAS C. ROWEN, OF SWAMPSCOTT, MASSACHUSETTS.

MICROMETER.

1,323,707.

Specification of Letters Patent.

Patented Dec. 2, 1919.

Application filed March 3, 1917. Serial No. 152,382.

*To all whom it may concern:*

Be it known that I, JAY A. MACKEY, a a citizen of the United States, and resident of Lynn, county of Essex, Commonwealth of Massachusetts, have invented an Improvement in Micrometers, of which the following description, in connection with the accompanying drawings, is a specification, like characters on the drawings representing like parts in each of the several views.

This invention relates to a micrometer device or tool adapted to measure accurately the rectilinear dimensions of objects and also, at will, the elevation of a given point or surface above a given base. To this end I provide coöperative contacting or calibrating members for engaging opposite surfaces or points on the object to be measured, these members having a special mounting for rough or coarse adjustments with respect to each other on a suitable bar or rail, and at least one of said members having provision for a relatively fine close adjustment with respect to the object to be gaged or measured, such provision being, if desired, the usual micrometer adjusting means. The foregoing and other objects and advantages of the invention will more fully appear from the following detailed description, and the distinctive features of novelty will be pointed out in the appended claim.

Referring to the drawings:

Figure 1 is a side elevation showing an illustrative embodiment of my invention;

Fig. 2 is a partial lengthwise section on line 2—2 of Fig. 1;

Fig. 3 is a side elevation showing the device equipped with a selectively usable element making the same well adapted for use in measuring distances or elevations above a given base; and Fig. 4 is a partial rear elevation of the form shown in Fig. 3 looking from the right in said figure.

I provide a bar or rail 10 having its sides and edges machined true and in accurate parallelism, and fit accurately thereon for sliding adjustment, the slide-block 11 which consists in a back 12 adapted to fit flush against one face of the bar 10 and with side flanges 13 fitting the edges of said bar. The slide-block 11 has laterally extending therefrom one of the calibrating or gaging members or arms 14 which extends out at right angles to the bar 10 and is equipped with a suitable micrometer pin 15 having a usual fine adjustment through the member 14 equipped with suitable micrometer graduations 16 and a knurled operating head 17 as is common in such devices. The block 11 is of some little lengthwise extent and is formed with spaced apart holes 18 in which are fitted bushing sleeves 19 to receive headed clamp pins or bolts 20. The bar 10 is formed throughout the major portion of its length with a series of similarly spaced apart holes 21 equipped with bushing sleeves 22. The clamp pins or bolts 20 are of a length to extend through the holes, both of the block 11 and of the bar 10 and to project some little from the bar where their threaded ends 23 are fitted with nuts 24. Since the holes 21 in the bar 10 are spaced the same distances apart as the two holes 18 of the slide-block it results that the block 11 may be adjusted along the bar 10, the pins 20 being first removed, to any point desired which will attain as close an approximation as may be to the dimension of the object to be measured, and then the pins 20 may be fitted through the nearest ones of the bushings 22 and clamped in place by the nuts 24. For coöperation with the gaging or calibrating arm 14 I provide a backing bracket or arm 25 equipped with a slide-block 26 fitted for adjustment along the bar 10 adjacent one end thereof, this bracket arm 25 having as is usual an upturned machined end 27 for coöperation with the adjustable micrometer pin 15. The slide-block 26 is formed similarly to the slide-block 11, with a back and side portions fitting around the bar 10, and the back portion is likewise provided with spaced apart holes 27 equipped with bushing sleeves 28 through which are passed clamping bolts 29, said bolts extending also through bushed holes 30 in the bar 10 and having projecting threaded ends equipped with clamp nuts 31 at the back of said bar; the nuts 31 as well as the nuts 24 being preferably equipped with knurled peripheries so as to be conveniently adjusted by hand. The lower portion of the rail 10 may be provided with a series of the bushed holes 30, three such holes being shown spaced apart according to the spacing of the holes 27 in the block 26, such spacing as shown being somewhat closer together than the spacing of the holes 21 in the upper major portion of the bar. Thus the backing bracket 25 may be adjusted along the bar 10 toward and from the coöperating micrometer arm 14 by a series of steps that are intermediate the spacing of the holes 21. Thus after the arm 14 has been set on the bar 10 as close as may be to the required adjustment as permitted by the spacing of the holes 21, the bracket arm 25 may be set so as to make a somewhat closer approximation to final relative adjusted position between the micrometer arms 14, 25 by virtue of the closer spacing of the holes 30 and then the micrometer member 15 may be operated after the usual fashion in micrometer calipers to get the final accurate measurement. In Fig. 3 the bar 10 is shown as equipped with bushed spaced apart holes 21 and the micrometer arm 14 bearing the micrometer pin 15 is the same as just described. The bar 10 is also provided with a series shown as three, of bushed holes near its lower end spaced closer together than the holes 21 as already described. The device is here shown as equipped with means specially adapted for accurately measuring the height of objects within wide limits above a given base and for this purpose in place of the bracket arm 25 I provide a base member 32 having a slide-block sleeve 33 formed therewith adapted to fit for sliding on the bar 10 and equipped with bushed holes 34 spaced apart similarly as the holes 27 to receive the clamp bolts 29 for clamping the bar 10 adjustably to such base. Thereupon the micrometer arm 14 may be adjusted as required along the bar 10 to effect a rough adjustment, a relatively closer adjustment being permitted by the adjustment of the bar 10 with respect to the base 32, and then the final micrometer adjustment by the manipulation of the micrometer pin 15 as already described.

The height gage base 32 which is thus selectively applicable to the bar 10 in place of the bracket arm 25 permits the device to be quickly and conveniently changed from a micrometer caliper to a height gage or vice versa, and it is to be noted as shown by reference to Fig. 3 that in changing from the micrometer caliper arm 25 to the height gage base 32 there is a zero reading of the micrometer spindle 15 without involving any adjustment or setting of the micrometer barrel head 17.

It will thus be understood that my improved device is adapted to extend the field of usefulness of a micrometer caliper from the relatively narrow limits in which the same is usually employed such as for gaging sheet or wire material, so that like micrometer measurements may be taken of objects of widely varying dimension, the rough or coarse adjustment being in each case effected by the adjustable clamping of the arm 14 in selected ones of the holes 21, then a relatively closer adjustment being effected, if required, by the adjustable setting of the bracket arm 25 or the base 32 in selected ones of the holes 30, and finally a micrometer adjustment of the micrometer pin 15 in the arm 14. It will of course be understood that in practice the holes 21 will be spaced definite predetermined distances apart, and the holes 30 spaced some definite aliquot part of the spacing between the holes 21, and the spacing of both these series of holes definitely coördinated with respect to the adjustment of the micrometer pin 15 so that the total dimension of the object to be gaged can be readily determined by comparing and summing up the setting and adjustment of these several elements. I am aware that the invention may be embodied in other specific forms without departing from the spirit or essential attributes thereof, and I therefore desire the present embodiment to be considered as illustrative and not restrictive, reference being had to the appended claim rather than to the foregoing description to indicate the scope thereof.

Having described my invention, what I claim as new and desire to secure by Letters Patent is:

A device of the kind described, comprising coöperating micrometer members provided with means for obtaining micrometer measurements therebetween including a bar constituting a mounting for said members, a part of said bar provided with a series of similarly spaced apart holes, and another part provided with another series of holes spaced a less distance apart than the first named series, one of said micrometer members having a clamping portion equipped with a plurality of holes spaced similarly to the first named series of holes in said bar to receive clamping bolts, and the other of said micrometer members having a plurality of holes spaced similarly to the second named series of holes in said bar to receive clamping bolts.

In testimony whereof, I have signed my name to this specification.

JAY A. MACKEY.